United States Patent
Fukuda et al.

(10) Patent No.: US 12,394,153 B2
(45) Date of Patent: Aug. 19, 2025

(54) THREE-DIMENSIONAL MODEL GENERATION METHOD AND THREE-DIMENSIONAL MODEL GENERATION DEVICE

(71) Applicant: Panasonic Intellectual Property Management Co., Ltd., Osaka (JP)

(72) Inventors: Masaki Fukuda, Osaka (JP); Toru Matsunobu, Osaka (JP); Satoshi Yoshikawa, Hyogo (JP); Kensho Teranishi, Osaka (JP); Ukyou Katsura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 18/117,056

(22) Filed: Mar. 3, 2023

(65) Prior Publication Data

US 2023/0206558 A1   Jun. 29, 2023

Related U.S. Application Data

(63) Continuation of application No. PCT/JP2021/027087, filed on Jul. 20, 2021.

(30) Foreign Application Priority Data

Sep. 18, 2020   (JP) .................. 2020-157090

(51) Int. Cl.
    *G06T 17/10*   (2006.01)
(52) U.S. Cl.
    CPC .................. *G06T 17/10* (2013.01)

(58) Field of Classification Search
    None
    See application file for complete search history.

(56) References Cited

U.S. PATENT DOCUMENTS

2006/0269141 A1\* 11/2006 Takahashi ............... G06T 7/12
                                                          382/199
2007/0242872 A1   10/2007 Rudin et al.
(Continued)

FOREIGN PATENT DOCUMENTS

JP   2010-237804   10/2010
JP   2017-130146   7/2017

OTHER PUBLICATIONS

Supplementary European Search Report issued May 9, 2024 in corresponding European Patent Application No. 21869022.0.
(Continued)

*Primary Examiner* — Yi Wang
(74) *Attorney, Agent, or Firm* — Wenderoth, Lind & Ponack, L.L.P.

(57) ABSTRACT

A three-dimensional model generation method includes: detecting a first line from each of a plurality of images of a target area shot to detect a plurality of first lines, the plurality of images being shot from a plurality of viewpoints; excluding, from the plurality of first lines detected, a second line that reaches an edge of an image among the plurality of images; and generating a line segment model which is a three-dimensional model of the target area represented by lines, using a plurality of line segments which are the plurality of first lines from which the second line is excluded.

7 Claims, 9 Drawing Sheets

(56) References Cited

U.S. PATENT DOCUMENTS

| | | |
|---|---|---|
| 2008/0292180 A1 | 11/2008 | Kobayashi et al. |
| 2010/0250588 A1 | 9/2010 | Kita |
| 2012/0002841 A1* | 1/2012 | Aratani .................. G06T 7/593 |
| | | 382/103 |
| 2016/0259974 A1* | 9/2016 | Macciola ........... G06V 30/1456 |
| 2019/0220946 A1* | 7/2019 | Tagami ................. H04N 1/387 |
| 2019/0385363 A1 | 12/2019 | Porter et al. |

OTHER PUBLICATIONS

Rafael Grompone von Gioi, et al., "LSD: A Line Segment Detector", Image Processing On Line, XP055610005, Mar. 24, 2012, pp. 1-10.

International Search Report (ISR) issued on Sep. 28, 2021 in International (PCT) Application No. PCT/JP2021/027087.

Yoichi Kunii, et al., "Application of Image Sequential Analysis for 3D Modeling of Cultural Heritage", Transactions of the Institute of Systems, Control and Information Engineers, vol. 17, No. 11, 2004, pp. 489-497, with partial English translation.

* cited by examiner

THREE-DIMENSIONAL MODEL GENERATION METHOD AND THREE-DIMENSIONAL MODEL GENERATION DEVICE

CROSS REFERENCE TO RELATED APPLICATION

This is a continuation application of PCT International Application No. PCT/JP2021/027087 filed on Jul. 20, 2021, designating the United States of America, which is based on and claims priority of Japanese Patent Application No. 2020-157090 filed on Sep. 18, 2020. The entire disclosures of the above-identified applications, including the specifications, drawings and claims are incorporated herein by reference in their entirety.

FIELD

The present disclosure relates to a three-dimensional model generation method and a three-dimensional model generation device.

BACKGROUND

Patent literature (PTL) 1 discloses technology for generating a three-dimensional model of a subject by using a plurality of images obtained by shooting the subject from a plurality of viewpoints.

CITATION LIST

Patent Literature

PTL 1: Japanese Unexamined Patent Application Publication No. 2017-130146

SUMMARY

Technical Problem

In the generating and processing of three-dimensional models, there is a demand for improving accuracy of three-dimensional models. An object of the present disclosure is to provide a three-dimensional model generation method or a three-dimensional model generation device that is capable of improving the accuracy of three-dimensional models.

Solution to Problem

A three-dimensional model generation method according to one aspect of the present disclosure includes: detecting a first line from each of a plurality of images of a target area shot to detect a plurality of first lines, the plurality of images being shot from a plurality of viewpoints; excluding, from the plurality of first lines detected, a second line that reaches an edge of an image among the plurality of images; and generating a line segment model which is a three-dimensional model of the target area represented by lines, using a plurality of line segments which are the plurality of first lines from which the second line is excluded.

Advantageous Effects

The present disclosure can provide a three-dimensional model generation method or a three-dimensional model generation device that is capable of improving the accuracy of three-dimensional models.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
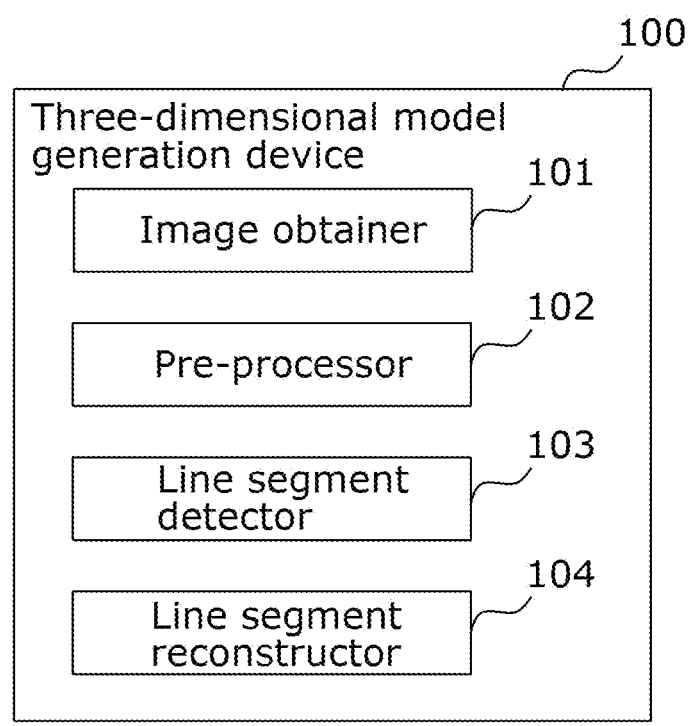
FIG. 1 is a block diagram of a three-dimensional model generation device according to an embodiment.

A three-dimensional model generation method according to one aspect of the present disclosure includes: detecting a first line from each of a plurality of images of a target area shot to detect a plurality of first lines, the plurality of images being shot from a plurality of viewpoints; excluding, from the plurality of first lines detected, a second line that reaches an edge of an image among the plurality of images; and generating a line segment model which is a three-dimensional model of the target area represented by lines, using a plurality of line segments which are the plurality of first lines from which the second line is excluded.

Accordingly, accuracy of three-dimensional models can be improved.

For example, in the excluding of the second line, among the plurality of first lines, a third line that reaches the edge of the image may be segmented into the second line that reaches the edge of the image and a line segment that does not reach the edge of the image, and the second line may be excluded from the plurality of first lines.

Accordingly, since a portion of the line segment that reaches an edge of an image may be used for generating a three-dimensional model, the accuracy of the three-dimensional model can be improved.

For example, the second line that reaches the edge of the image and the line segment that does not reach the edge of the image may be identified by segmenting the third line at a location at which the third line overlaps another line.

Accordingly, line segments can be segmented in an appropriate manner.

For example, in the detecting of the first line, the first line may be detected by a search process using a search window on an image among the plurality of images, and the search window may be a rectangle having long sides that extend in a direction of the first line.

Accordingly, since it is possible to improve the accuracy of line segment detection, the accuracy of three-dimensional models generated using line segments can be improved.

For example, the rectangle may be positioned to have the long sides extend in the direction of the first line which is a direction other than a vertical direction of the image and a horizontal direction of the image.

Accordingly, since it is possible to improve the accuracy of line segment detection, the accuracy of three-dimensional models generated using line segments can be improved.

Furthermore, a three-dimensional model generation device according to one aspect of the present disclosure includes a processor and memory. Using the memory, the processor: detects a first line from each of a plurality of images of a target area shot from a plurality of viewpoints to detect a plurality of first lines; excludes from the plurality of first lines detected, a second line that reaches an edge of an image among the plurality of images; and generates a line segment model which is a three-dimensional model of the target area represented by lines, using a plurality of line segments which are the plurality of first lines from which the second line is excluded.

Accordingly, it is possible to improve the accuracy of three-dimensional models. It should be noted that second lines need not be excluded and it is sufficient that line segments are identified.

It should be noted that these generic and specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, exemplary embodiments will be specifically described with reference to the drawings. It should be noted that the embodiments described below merely illustrate specific examples of the present disclosure. The numerical values, shapes, materials, elements, the arrangement and connection of the elements, steps, the order of the steps, etc., described in the following embodiments are mere examples, and are therefore not intended to limit the present disclosure. Accordingly, among elements in the following embodiments, those not appearing in any of the independent claims will be described as optional elements.

EMBODIMENT

First, a configuration of a three-dimensional model generation device according to the present embodiment will be described. FIG. 1 is a block diagram of three-dimensional model generation device 100 according to the present embodiment. Three-dimensional model generation device 100 generates a line segment model which is a three-dimensional model represented using line segments.

It should be noted that a three-dimensional model is a representation of an imaged target area (target object or target space), or the like, made on a computer. Three-dimensional models have, for example, position information of respective three-dimensional locations on a measurement target. Furthermore, line segment models are not limited to line segments, and may be three-dimensional models represented using lines. Here, the term line includes a line segment which has two ends, a half-line which has only one end, or a line which has no ends. Furthermore, having no ends means that the ends are cut off in the image (the line reaches both ends of the image), for example.

Three-dimensional model generation device 100 includes image obtainer 101, pre-processor 102, line segment detector 103, and line segment reconstructor 104.

Figure 2:
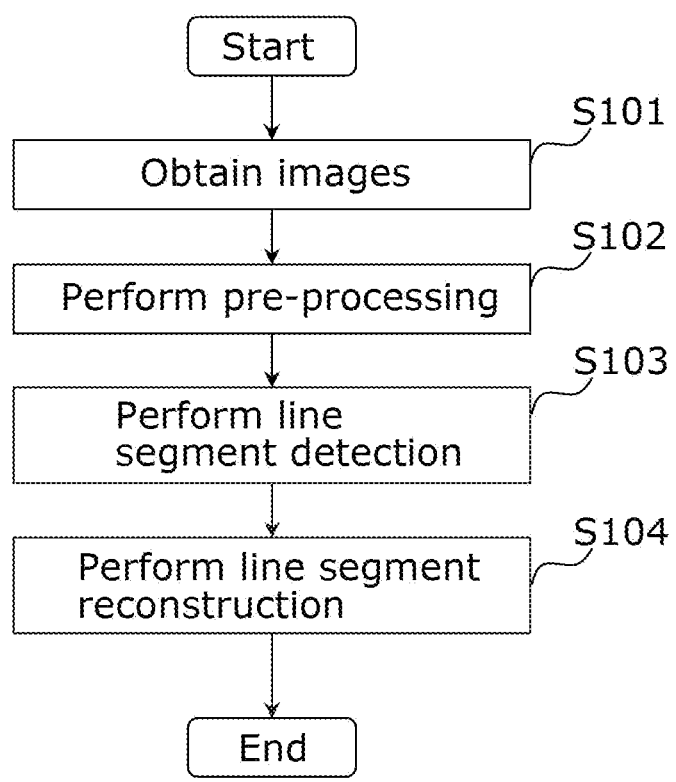
FIG. 2 is a flowchart of a three-dimensional model generation process according to an embodiment.

FIG. 2 is a flowchart of a three-dimensional model generation process performed by three-dimensional model generation device 100. First, image obtainer 101 obtains a plurality of images that have been shot by an imaging device, such as a camera (S101). Here, the plurality of images are two or more images of the same target area (target object or target space) that have been shot from different viewpoints. Each of the plurality of images may be composed of a still images or videos. It should be noted that image obtainer 101 may obtain a plurality of images from an external device via a network or the like. Furthermore, if three-dimensional model generation device 100 is included in a terminal apparatus, or the like, that is equipped with a camera, image obtainer 101 may obtain a plurality of images that have been shot by the camera.

Moreover, the plurality of images may be a plurality of images that have been shot by a plurality of fixed-position cameras. Additionally, the plurality of images may be composed of 2-viewpoint images that have been shot from a single position using a stereo camera. Furthermore, the plurality of images may be composed of a plurality of frames included in a video shot by a single camera that is in motion. Moreover, the plurality of images may be a combination of any of the above-mentioned.

Next, pre-processor 102 executes image pre-processing or pre-processing for line segment reconstruction (line segment matching) or a combination thereof (S102). Image pre-processing refers to, for example, brightness adjustment, noise removal, resolution conversion, color space conversion, lens distortion correction, projective transformation, affine transformation, edge enhancement processing, trimming processing, or a combination of these processes.

It should be noted that pre-processing (S102) may be performed at any arbitrary timing as long as it precedes line segment detection processing (S103). For example, pre-processing (S102) may be performed at the same timing as line segment detection processing (S103), and it is also possible to perform pre-processing (S102) in advance, and the plurality of images that have been pre-processed may be stored in a storage included in three-dimensional model generation device 100. It should be noted that pre-processing need not necessarily be performed. In other words, three-dimensional model generation device 100 need not be provided with pre-processor 102.

Next, line segment detector 103 detects line segments in each of the plurality of images that have been pre-processed (S103). It should be noted that details of this process will be described later.

Next, line segment reconstructor 104 performs line segment reconstruction in which a line segment model, which is a three-dimensional model, is generated by using the plurality of line segments that have been detected (S104). More specifically, line segment reconstructor 104 calculates the feature amount of each of the detected line segments. Next, line segment reconstructor 104 performs matching of line segments between images using the calculated feature amounts. Specifically, line segment reconstructor 104 detects corresponding line segments which are line segments that correspond to each other (i.e., are the same) between images. Next, line segment reconstructor 104 estimates the camera parameters (three-dimensional positions and orientations) of the respective images and the three-dimensional positions of the line segments by geometrical calculation using the relationship between the corresponding line segments. With this, a line segment model is generated. It should be noted that the above-described line segment reconstruction method is merely an example, and any commonly known method may be used.

Figure 3:
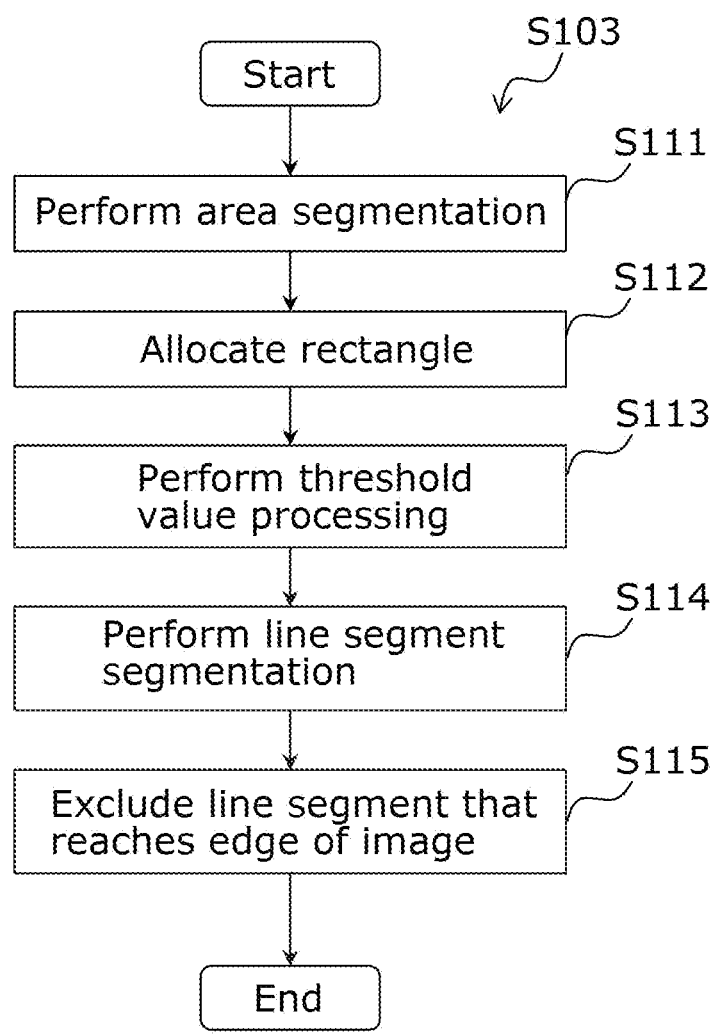
FIG. 3 is a flowchart of a line segment detection process according to an embodiment.

Hereinafter, the line segment detection process (S103) will be described. FIG. 3 is a flowchart of the line segment detection process (S103).

First, line segment detector 103 receives the plurality of images that have been pre-processed and performs area segmentation of each of the images (S111). FIG. 4 through FIG. 9 are diagrams for describing the area segmentation process. These figures illustrate an enlarged view of a portion of an image, and each square represents a pixel.

Figure 4:
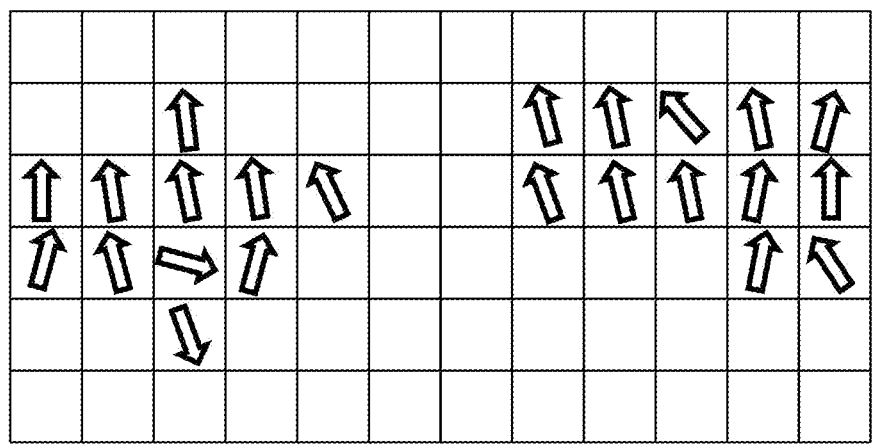
FIG. 4 is a diagram for describing an area segmentation process according to an embodiment.

First, as illustrated in FIG. 4, line segment detector 103 detects the brightness gradient of each pixel. In these figures, for a pixel that has a brightness gradient (pixel having a brightness gradient that is greater than or equal to a threshold value), the direction of the arrow indicates the direction of this brightness gradient. Next, line segment detector 103 allocates pixels having similar brightness gradient directions to the same area.

Figure 5:
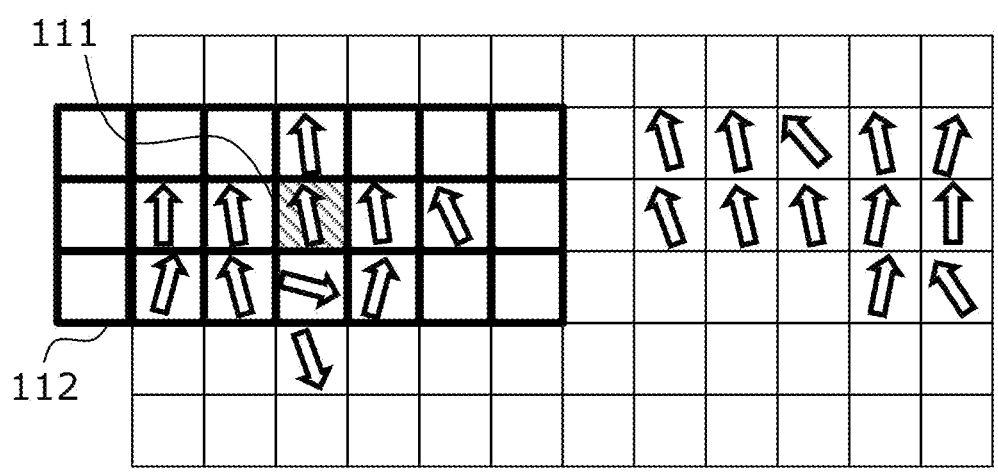
FIG. 5 is a diagram for describing an area segmentation process according to an embodiment.
Figure 6:
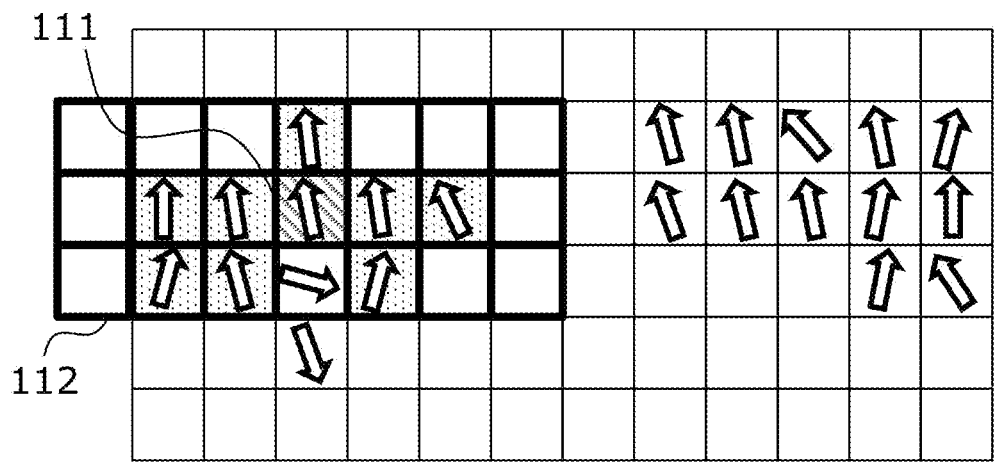
FIG. 6 is a diagram for describing an area segmentation process according to an embodiment.

More specifically, as illustrated in FIG. 5, line segment detector 103 sets a focal pixel 111 of interest, from among the pixels that have a brightness gradient. Next, line segment detector 103, for example, sets search window 112 which is centered on the focal pixel. Next, line segment detector 103 detects pixels having a brightness gradient pointing in a direction similar to the direction of the brightness gradient of focal pixel 111, from among the plurality of pixels inside search window 112. For example, line segment detector 103 detects pixels for which the angular difference between its brightness gradient and the brightness gradient of focal pixel 111 is less than or equal to a predetermined threshold value. With this, for example, the pixels indicated by the hatching illustrated in FIG. 6 are detected as pixels in the same area as focal pixel 111.

Figure 7:
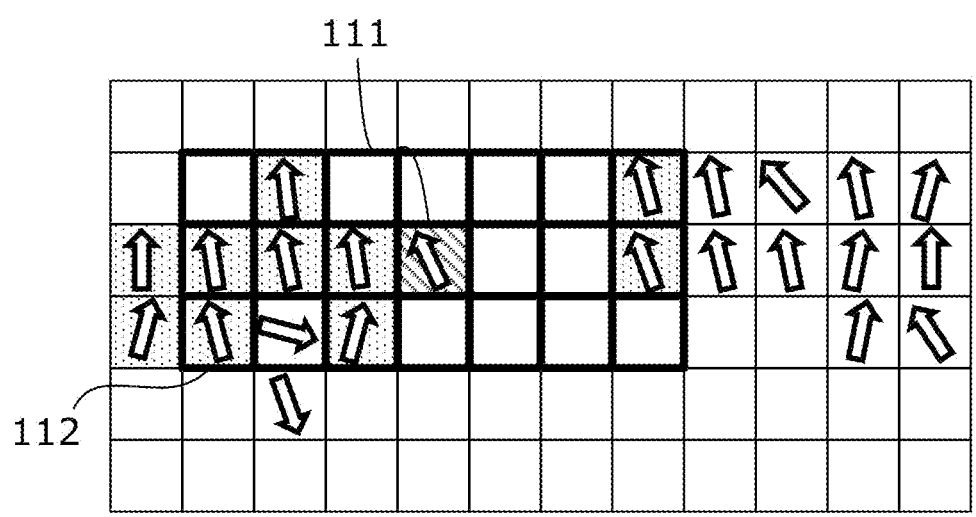
FIG. 7 is a diagram for describing an area segmentation process according to an embodiment.
Figure 8:
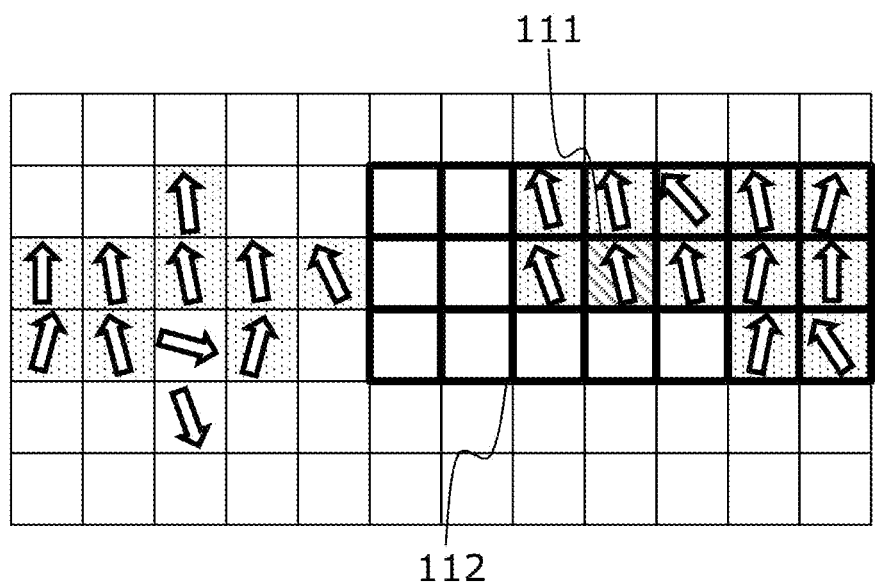
FIG. 8 is a diagram for describing an area segmentation process according to an embodiment.

Next, as illustrated in FIG. 7 and FIG. 8, line segment detector 103 moves focal pixel 111 and search window 112, and repeats the same process. For example, line segment detector 103 sets as the new focal pixel 111, a pixel that has been detected as being in the same area as the previous focal pixel 111 and that has not been set as focal pixel 111 in the past. Furthermore, line segment detector 103 moves the center of search window 112 to the location of the new focal pixel 111. By repeating this process until a new pixel can no longer be detected, line segment detector 103 detects an area that is composed of a plurality of pixels that have brightness gradients that are the same as the initial focal pixel 111. Furthermore, by setting a pixel which has not been allocated to the area as the new initial focal pixel and repeating the series of processes, a plurality of areas are detected. It should be noted that the initial focal pixel 111 may be set at random, or may be a pixel at an edge of the image.

It should be noted that, for the brightness gradient that serves as a reference used when detecting a pixel that has a brightness gradient direction that is similar to the brightness gradient direction of focal pixel 111, the brightness gradient of the initial focal pixel 111 may be used, the brightness gradient of the current focal pixel 111 may be used, or a value (i.e., an average value or weighted average value) calculated from the brightness gradients of a plurality of pixels that have already been allocated to that area, or the like, may be used. Furthermore, the search method described here is merely an example, and methods other than those described above may be used Here, in the present embodiment, the shape of search window 112 is rectangular, and its length in the horizontal direction and length in the vertical direction in the image are different. It should be noted that although the example illustrated here is for search window 112 that measures 3×7 pixels in size, search window 112 may be of any size. Furthermore, line segment detector 103 positions search window 112 so that the long sides of search window 112 are pointed in a direction perpendicular to the brightness gradient. For example, in the example illustrated in FIG. 5, since the direction of the brightness gradient extends in the vertical direction of the image, search window 112 is positioned to have the long sides of search window 112 extend in the horizontal direction of the image. Here, a direction perpendicular to the direction of the brightness gradient corresponds to the direction of the line segment (direction in which the line segment extends). Furthermore, for the direction of the brightness gradient, the direction of the brightness gradient of the initial focal pixel 111 may be used, the direction of the brightness gradient of the current focal pixel 111 may be used, or a direction (i.e., an average value or weighted average value) calculated from the directions of the brightness gradients of a plurality of pixels that have already been allocated to that area, or the like, may be used.

Figure 9:
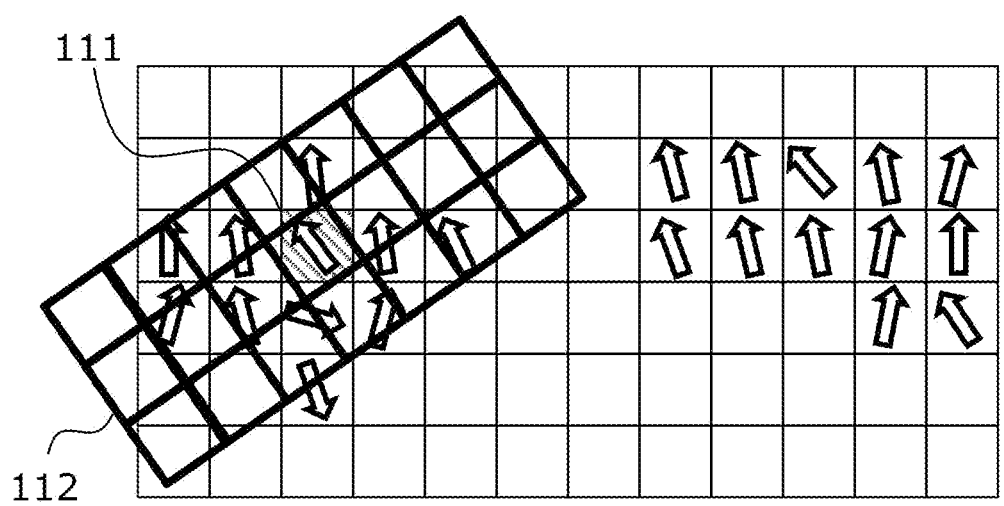
FIG. 9 is a diagram for describing an area segmentation process according to an embodiment.

It should be noted that the direction of search window 112 does not need to perfectly coincide with the direction of the brightness gradient. For example, a plurality of candidates for the direction of search window 112 may be set in advance, and the candidate having the direction that is closest to the direction that is perpendicular to the brightness gradient may be selected. The plurality of candidates include at least the vertical direction and horizontal direction (crosswise direction (row direction) and lengthwise direction (column direction) of the image). Furthermore, the plurality of candidates may also include diagonal directions (directions other than crosswise directions and lengthwise directions of the image) as illustrated in FIG. 9. Furthermore, if search window 112 is positioned diagonally, the pixels to be searched may be pixels that are at least partially contained in search window 112, pixels whose entire area is contained in search window 112, or pixels having at least a predetermined surface area or larger contained in search window 112. For example, search window 112 is positioned so that the angular difference between the long sides of search window 112 and the direction of the line segment (direction perpendicular to the brightness gradient) is less than the angular difference between the short sides of search window 112 and the direction of the line segment.

Here, if brightness gradient intensity in the image is insufficient due to the impact of blur or noise, there may be cases where a portion that should otherwise be detected as one line segment (area) is erroneously detected as two line segments (areas). For example, in the examples illustrated in FIG. 4 through FIG. 8, and the like, the area between the area on the right side and the area on the left side can be considered to be an area where brightness gradient intensity is insufficient due to the impact of blur or noise. In this case, for example, if a square search window (that measures 3×3, for example) is used, the left and right areas would be detected as separate areas. Similarly, even if search window 112 measuring 3×7 is used, if search window 112 is positioned so that its long sides are pointed in the vertical direction, the left and right areas would be detected as separate areas. On the other hand, as previously mentioned, positioning search window 112 so that the long sides of search window 112 are perpendicular to the direction of the brightness gradient (horizontal direction in FIG. 5, etc.) makes it possible to detect the left and right areas as a single area. Accordingly, line segment detector 103 can increase the accuracy of area segmentation. In this way, line segment detection accuracy is improved, thereby improving the accuracy of the line segment model.

It should be noted that although brightness gradients are used for the detection of a line segment area in the example described, any method that is commonly used for edge detection may be used. For example, the gradient of other pixel values may be used in place of brightness gradients. Here, for the other pixel values, the gradient of one component among R, G, and B components may be used, for example. For example, if the color of the target object is already known, the component corresponding to that color may also be used. Furthermore, aside from a gradient (first derivative value), a second derivative value may also be used.

Once again, FIG. 3 will be described. After area segmentation processing (S111), line segment detector 103 allocates, for each of the segmented areas obtained, a rectangle that covers the segmented area (S112). Next, line segment detector 103 executes a threshold value process which is a filtering process based on the shape and size of the rectangle (S113). Specifically, line segment detector 103 compares the size (surface area) of the rectangle and the size (surface area) of the segmented area, and detects the center line of the rectangle as a line segment if the proportion of the rectangle occupied by the segmented area is equal to or greater than a predetermined threshold value. With this, the line segments included in each image are detected.

Figure 10:
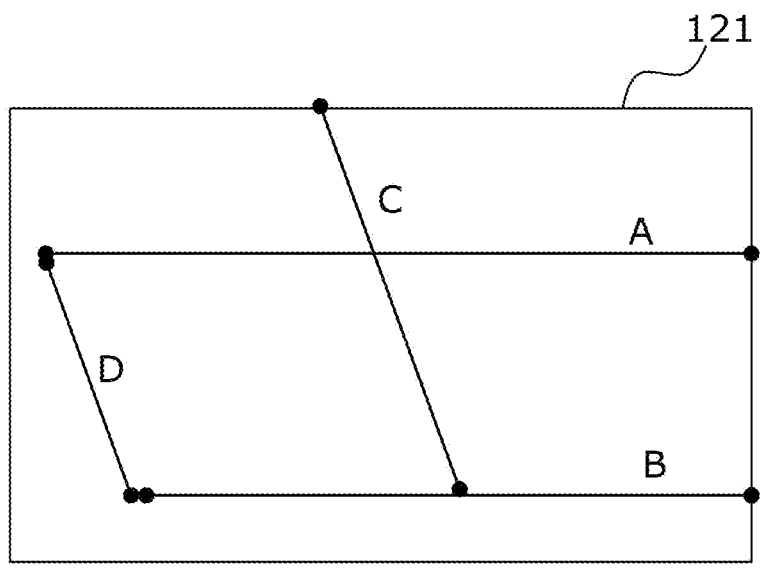
FIG. 10 is a diagram for describing a line segment segmentation process according to an embodiment.
Figure 11:
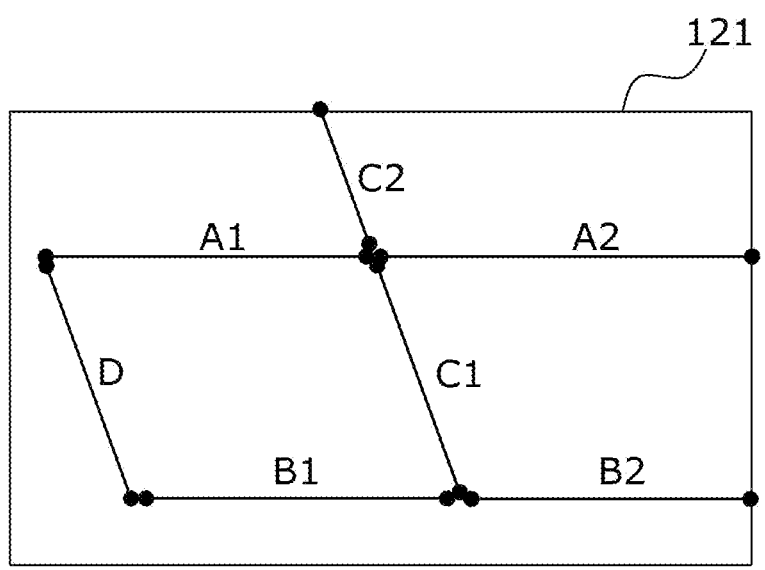
FIG. 11 is a diagram for describing a line segment segmentation process according to an embodiment.

Next, line segment detector 103 detects a pair of line segments that are intersecting, and generates a plurality of line segments by segmenting the line segments at the point of intersection (S114). FIG. 10 and FIG. 11 are diagrams for describing a line segment segmentation process. In the example illustrated in FIG. 10, there are four line segments in image 121, namely, A, B, C, and D. Here, line segment A and line segment C are intersecting, and line segment B and line segment C are intersecting. Accordingly, line segment detector 103 generates line segment A1 and line segment A2 by segmenting line segment A at the point of intersection between line segment A and line segment C. Line segment detector 103 generates line segment B1 and line segment B2 by segmenting line segment B at the point of intersection between line segment B and line segment C. Line segment detector 103 generates line segment C1 and line segment C2 by segmenting line segment C at the point of intersection between line segment A and line segment C.

It should be noted that although the example described here relates to the segmentation of each of two line segments at the point of intersection between the two line segments, a given line segment may be segmented at a location where the given line segment overlaps another line segment (connecting location). For example, if one end of a first line segment is located above a second line segment (for example, in a T-shaped formation), the second line segment may be segmented at the location where the one end of the first line segment and the second line segment overlap (connecting location).

It should be noted that the location at which line segments may be segmented is not limited to the location of the point of intersection between two line segments. For example, a line segment which reaches an edge of an image may be segmented at a location that is a predetermined distance away from the edge of an image.

Figure 12:
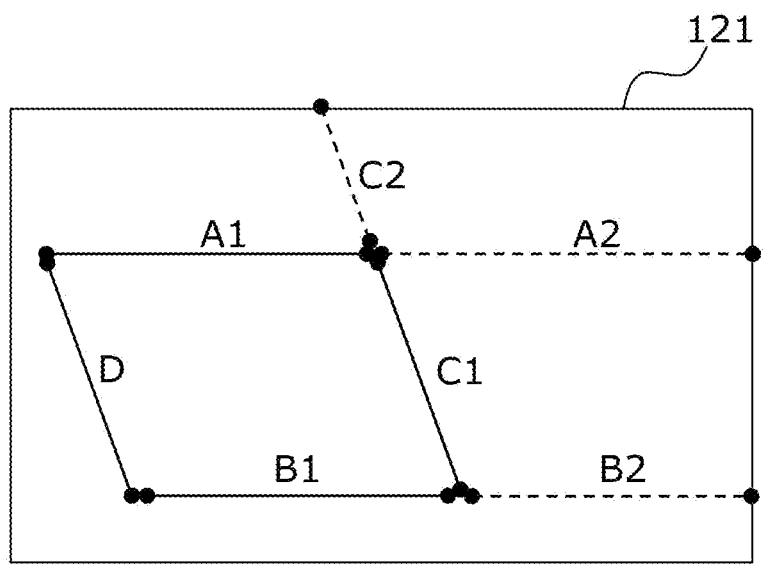
FIG. 12 is a diagram for describing a line segment exclusion process according to an embodiment.

Next, line segment detector 103 executes a filtering process on the segmented line segments based on the position and length, or the like, of the line segments. Specifically, line segment detector 103 excludes a line segment that reaches an edge of an image from the plurality of line segments (S115). FIG. 12 is a diagram for describing this line segment exclusion process. In the example illustrated in FIG. 12, since line segments A2, B2, and C2 reach an edge of the screen of image 121, line segments A2, B2, and C2 are excluded. Here, a "line segment reaching an edge of an image" means that at least one end of the line segment coincides with an edge of the screen. Furthermore, line segments generated in this way are used to perform line segment reconstruction (S104).

Here, the line segments that reach an edge of the image have lengths that are different from the lengths of the actual line segments. Accordingly, there is a risk of degraded line segment reconstruction accuracy in cases where line segment reconstruction is performed using such line segments. On the other hand, in the present embodiment, it is possible to improve the accuracy of line segment reconstruction by excluding such line segments.

Furthermore, in the present embodiment, as pre-processing for the exclusion of line segments, a detected line segment is separated at the cross-point where it intersects with another line segment. Accordingly, since this allows the amount of the line segments that are to be excluded during line segment exclusion to be reduced, it is possible to inhibit the degradation of line segment reconstruction accuracy.

It should be noted that, although in the description given above, the exclusion process (S115) is performed on the segmented line segments after line segment segmentation (S114) has been performed, the exclusion process (S115) may be performed on the plurality of line segments generated in step S113 without performing line segment segmentation (S114).

Figure 13:
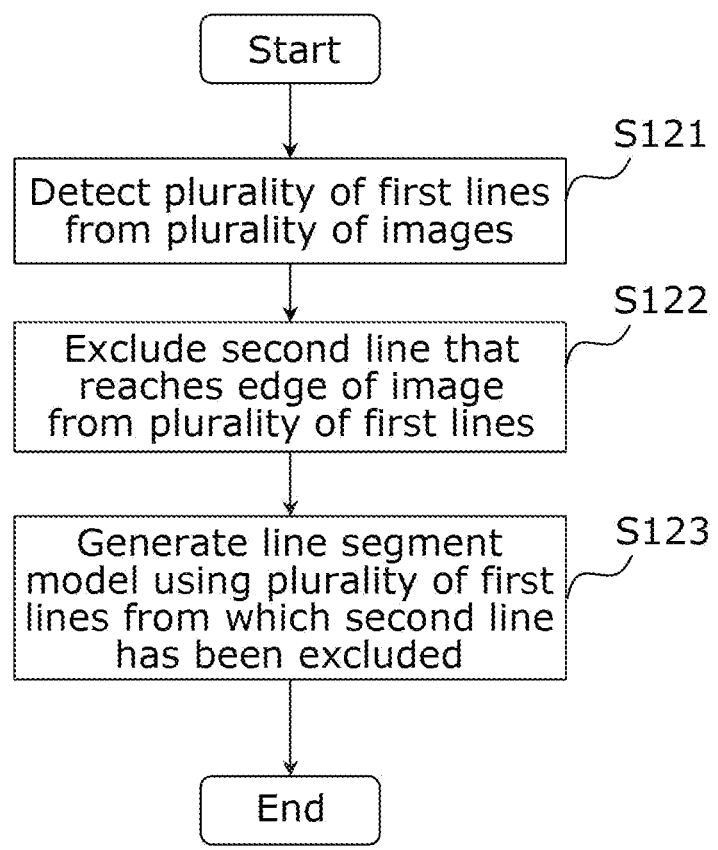
FIG. 13 is a flowchart of a three-dimensional model generation process according to an embodiment.

As described above, three-dimensional model generation device 100 according to the present embodiment performs the process illustrated in FIG. 13. Three-dimensional model generation device 100 detects a first line from each of a plurality of images of a target area shot to detect a plurality of first lines, the plurality of images being shot from a plurality of viewpoints (S121), excludes from the plurality of first lines detected, a second line that reaches an edge of an image among the plurality of images (S122), and generates a line segment model which is a three-dimensional model of the target area represented by lines, using a plurality of line segments which are the plurality of first lines from which the second line is excluded (S123). Accordingly, the three-dimensional model generation device is capable of improving the accuracy of three-dimensional models.

For example, in the excluding of the second line, three-dimensional model generation device 100 segments, among the plurality of first lines, a third line that reaches the edge of the image into the second line that reaches the edge of the image and a line segment that does not reach the edge of the image, and excludes the second line from the plurality of first lines. In other words, of the third lines, three-dimensional model generation device 100 retains the line segments that do not reach an edge of an image as line segments. Accordingly, since a portion of the line segments that reach an edge of an image may be used for generating a three-dimensional model, the accuracy of the three-dimensional model can be improved.

For example, three-dimensional model generation device 100 identifies the second line that reaches the edge of the image and the line segment that does not reach the edge of the image by segmenting the third line at a location at which the third line overlaps another line. The location where they overlap corresponds to, for example, a corner of the target object. The corners of a target object are locations at which feature point mapping is easier to perform during three-dimensional model generation. Consequently, by segmenting a third line at a location where the third line overlaps another line, the accuracy of the three-dimensional model can be improved.

For example, in the detecting of the first line, three-dimensional model generation device 100 detects the first line by a search process using a search window on an image among the plurality of images, and the search window is a rectangle having long sides that extend in a direction of the first line. Accordingly, since it is possible to improve the accuracy of line segment detection, the accuracy of three-dimensional models generated using line segments can be improved.

For example, the rectangle is positioned to have the long sides extend in the direction of the first line which is a direction other than a vertical direction of the image and a horizontal direction of the image. Accordingly, since it is possible to improve the accuracy of line segment detection, the accuracy of three-dimensional models generated using line segments can be improved.

For example, three-dimensional model generation device 100 includes a processor and memory, and the processor performs the above-mentioned processes using the memory.

Although a three-dimensional model generation device, and so on, according to the present embodiment has been described above, the present disclosure is not limited to this exemplary embodiment.

Furthermore, each of the processing units included in the three-dimensional model generation device, and so on, according to the foregoing embodiment is implemented typically as an LSI which is an integrated circuit. These processing units may be configured as individual chips or may be configured so that a part or all of the processing units are included in a single chip.

Furthermore, the method of circuit integration is not limited to LSIs, and implementation through a dedicated circuit or a general-purpose processor is also possible. A field programmable gate array (FPGA) that allows for programming after the manufacture of an LSI, or a reconfigurable processor that allows for reconfiguration of the connection and the setting of circuit cells inside an LSI may be employed.

Furthermore, although in each of the foregoing embodiments, the respective elements are configured using dedicated hardware, the respective elements may be implemented by executing software programs suitable for the respective elements. The respective elements may be implemented by a program executer such as a CPU or a processor reading and executing a software program recorded on a recording medium such as a hard disk or a semiconductor memory.

Furthermore, the present disclosure may be implemented as a three-dimensional model generation method, or the like, performed by a three-dimensional model generation device, or the like. Furthermore, the present disclosure may be realized as a device or method that includes a portion of the operations that are included in the three-dimensional model generation device. For example, the present disclosure may be realized as a line segment detection device that at least includes line segment detector 103.

Furthermore, as the block divisions illustrated in the block diagram are merely one example, multiple blocks may be realized as a single block, a single block may be divided into multiple parts, and parts may be transferred to other blocks. Additionally, operations of multiple blocks performing similar operations may be executed in parallel or by time-sharing, by a single hardware or software.

Furthermore, the sequence in which respective steps in the flowcharts are executed is given as an example to describe the present disclosure in specific terms, and thus other sequences are possible. Furthermore, part of the above-described steps may be executed simultaneously (in parallel) with another step.

Although a three-dimensional model generation device, and so on, according to one or more aspects are described above based on the foregoing embodiment, the present disclosure is not limited to this embodiment. Forms obtained by various modifications to the embodiments that may be conceived by a person of ordinary skill in the art or forms obtained by combining elements in different embodiments, for as long as they do not depart from the essence of the present disclosure, may be included in the one or more aspects.

INDUSTRIAL APPLICABILITY

The present disclosure is applicable to a three-dimensional model generation device.

The invention claimed is:

1. A three-dimensional model generation method comprising:
    detecting a first line from each of a plurality of images of a target area shot to detect a plurality of first lines, the plurality of images being shot from a plurality of viewpoints;
    excluding, from the plurality of first lines detected, a second line that reaches an edge of an image among the plurality of images; and
    generating a line segment model which is a three-dimensional model of the target area represented by lines, using a plurality of line segments which are the plurality of first lines from which the second line is excluded, wherein
    the generating of the line segment model includes:
    detecting, using feature amounts of the plurality of line segments, corresponding line segments that are line segments corresponding to each other between images included in the plurality of images; and
    estimating, by geometrical calculation using a relationship between the corresponding line segments detected, a three-dimensional position and an orientation of each of the plurality of images, and a three-dimensional position of each of the plurality of line segments.

2. The three-dimensional model generation method according to claim 1, wherein
    in the excluding of the second line, among the plurality of first lines, a third line that reaches the edge of the image is segmented into the second line that reaches the edge of the image and a line segment that does not reach the edge of the image, and the second line is excluded from the plurality of first lines.

3. The three-dimensional model generation method according to claim 2, wherein
    the second line that reaches the edge of the image and the line segment that does not reach the edge of the image are identified by segmenting the third line at a location at which the third line overlaps another line.

4. The three-dimensional model generation method according to claim 1, wherein
in the detecting of the first line, the first line is detected by a search process using a search window on an image among the plurality of images, and
the search window is a rectangle having long sides that extend in a direction of the first line.

5. The three-dimensional model generation method according to claim 4, wherein
the rectangle is positioned to have the long sides extend in the direction of the first line which is a direction other than a vertical direction of the image and a horizontal direction of the image.

6. The three-dimensional model generation method according to claim 1, wherein
the plurality of first lines correspond to edges in the plurality of images, and
in the line segment model, a shape of a target object in the target area is represented by lines, using the plurality of first lines.

7. A three-dimensional model generation device comprising:
a processor; and
memory, wherein
using the memory, the processor:
detects a first line from each of a plurality of images of a target area shot from a plurality of viewpoints to detect a plurality of first lines; and
generates a line segment model which is a three-dimensional model of the target area represented by lines, using line segments which are the plurality of first lines from which a second line that reaches an edge of an image among the plurality of images is excluded, wherein
the generating of the line segment model includes:
detecting, using feature amounts of the plurality of line segments, corresponding line segments that are line segments corresponding to each other between images included in the plurality of images; and
estimating, by geometrical calculation using a relationship between the corresponding line segments detected, a three-dimensional position and an orientation of each of the plurality of images, and a three-dimensional position of each of the plurality of line segments.

* * * * *